United States Patent [19]

Thomson

[11] Patent Number: 4,466,471
[45] Date of Patent: Aug. 21, 1984

[54] HACKSAW WITH IMPROVED BLADE-TENSIONING MECHANISM

[75] Inventor: Morton W. Thomson, Boylston, Mass.

[73] Assignee: Parker Manufacturing Company, Worcester, Mass.

[21] Appl. No.: 511,531

[22] Filed: Jul. 7, 1983

[51] Int. Cl.³ .............................................. B23D 49/12
[52] U.S. Cl. .................................. 145/33 A; 145/33 R
[58] Field of Search ............... 145/33 R, 33 A, 33 AB

[56] References Cited

U.S. PATENT DOCUMENTS

| | | | |
|---|---|---|---|
| 579,492 | 3/1897 | Morrell | 145/33 R |
| 2,194,494 | 3/1940 | Carroll | 145/33 A |
| 2,796,098 | 6/1957 | Dreier | 145/33 R |
| 4,256,156 | 3/1981 | Biszantz et al. | 145/33 A |
| 4,367,779 | 1/1983 | Ewig | 145/33 A |

Primary Examiner—Frederick R. Schmidt
Assistant Examiner—J. T. Zatarga
Attorney, Agent, or Firm—Thompson, Birch, Gauthier & Samuels

[57] ABSTRACT

A hacksaw with an improved mechanism for adjusting the tension on the blade. The mechanism includes a lever for vertically moving a rod to pivot a rocker arm to place tension on the rocker arm-held blade. The rod has a manually rotatable cross-member provided at its lower end. The rocker arm has a transversely extending seating groove provided on the lower surface of its rear portion to receive the cross-member and to retain it therein against rotational movement. The cross-member is rotatable by the user to provide a positive and replicable blade-tensioning means which is free from infinite adjustment-caused creep.

10 Claims, 7 Drawing Figures

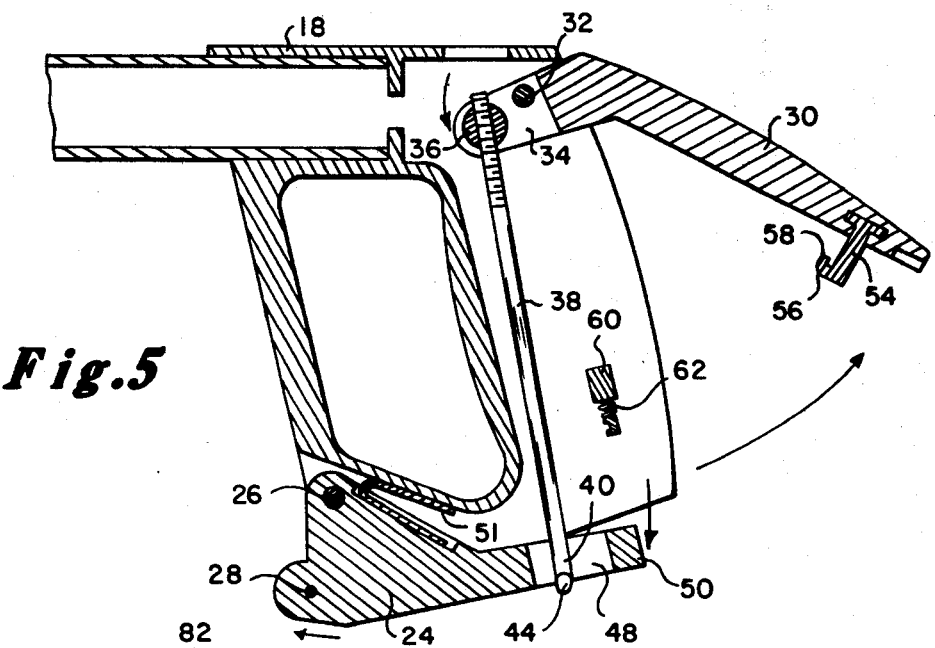
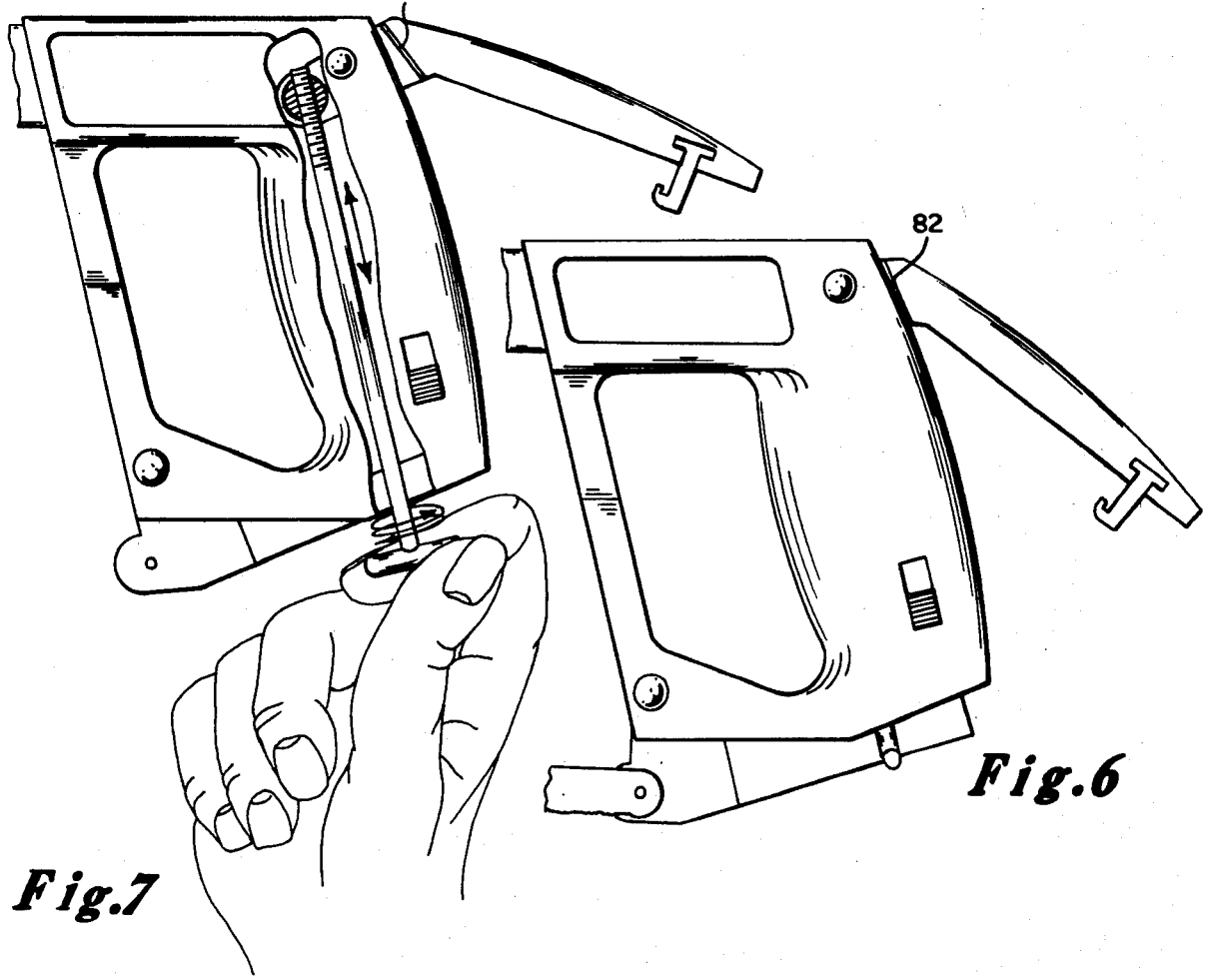

HACKSAW WITH IMPROVED BLADE-TENSIONING MECHANISM

BACKGROUND OF THE INVENTION

Applicant's invention is an improvement upon U.S. Pat. No. 4,367,779, issued Jan. 11, 1983. The hacksaw shown in that patent has a blade tension adjusting mechanism in which the tension rod is pivotally fixed to the forwardly extending rod mounting portion of the lever. The lower end of the tension rod is threaded. A knob is threadably and movably engaged to the lower end of the tension rod and is infinitely rotatably adjustable on the tension rod to raise the rear portion of the rocker arm (or to permit the rear portion of the rocker arm to be lowered).

This infinitely adjustable knob is subject to unwanted rotational displacement because of vibration or because of accidental contacts. This knob is also incapable of being readjusted to produce the same blade tension because of its infinite rotational adjustment capability.

It is an object of this invention to provide a hacksaw having an improved blade-tensioning mechanism which overcomes the foregoing problems by providing a positive and replicable blade-tensioning means which is free from infinite adjustment-caused creep.

SUMMARY OF THE INVENTION

This invention relates to a hacksaw having an improved blade-tensioning mechanism which is carried by the hacksaw handle. A rocker arm is pivotally mounted on the lower portion of frame handle. A blade-mounting back pin is provided on the forward portion of the rocker arm below the rocker arm pivot point. The hacksaw blade is mounted between the front pin and the back pin. A manually movable lever is pivotally attached at its upper end to the frame handle and has a rod-mounting portion which extends forwardly of the lever pivot point. A tension rod is threaded at its upper end and is screwed into a cylindical pivot pin which is transversely and rotatably mounted in the rod-mounting portion. The tension rod hangs downwardly and cooperates at its lower end with the rear portion of the rocker arm.

The lever pivot point and the tension rod pivot point are located with relation to each other such that pivoting the lever clockwise towards the frame handle causes the tension rod to be lifted, and vice versa. A latch is provided for locking the lever to the frame handle in the fully closed position. Pivoting the lever clockwise (towards the frame handle) increases the blade tension. Pivoting the lever counter-clockwise (away from the handle) decreases the blade tension.

An improved adjustable blade-tensioning means cooperates with the tension rod for altering the distance between the rear portion of the rocker arm and the tension rod pivot point. This improved adjustable blade-tensioning means includes a manually rotatable cross-member provided at the lower end of the tension rod which bears against the underside of the rear portion of the rocker arm. The improved adjustable blade-tensioning means also includes a seating groove provided on the lower surface of the rear portion of the rocker arm for engaging and positively preventing rotation of the cross-member when the cross-member is in contact with the rocker arm.

By manually rotating the cross-member, the distance between the rear portion of the rocker arm and the tension rod pivot point is altered. This results in altering the blade tension when the lever is closed and latched.

By rotating the cross-member from one seated position to another seated position, the adjustable blade-tensioning means provides a positive and replicable blade-tensioning mechanism which is free from infinite adjustment-caused creep.

DESCRIPTION OF THE DRAWINGS

FIG. 5 is a side elevation, in section, in which the lever is shown unlocked and open in its maximum counter-clockwise position.

FIG. 6 is a side elevation of the handle and related parts in which the lever is shown unlocked and open, and in which the visible blade-tension indicating means, which is a straight line provided on the lever, is shown aligned with the frame handle edge. This indicates that the recommended blade tension will be achieved when the lever is closed and locked.

FIG. 7 is a side elevation, partly cut away, of the handle (similar to FIG. 6) showing how the user manually rotates the cross-member which will alter the distance between the downwardly biased rear portion of the rocker arm and the tension rod pivot point.

DESCRIPTION OF THE PREFERRED EMBODIMENT

This invention is an improvement on the hacksaw shown in U.S. Pat. No. 4,367,779. The disclosure of that patent is incorporated by reference and made a part of this disclosure. The difference between the hacksaw shown and described in U.S. Pat. No. 4,367,779 and the hacksaw of this invention are entirely found in the blade-tensioning mechanism. Therefore, the other hacksaw components will only be briefly described because they are conventional and constitute no part of this invention.

Figure 1:
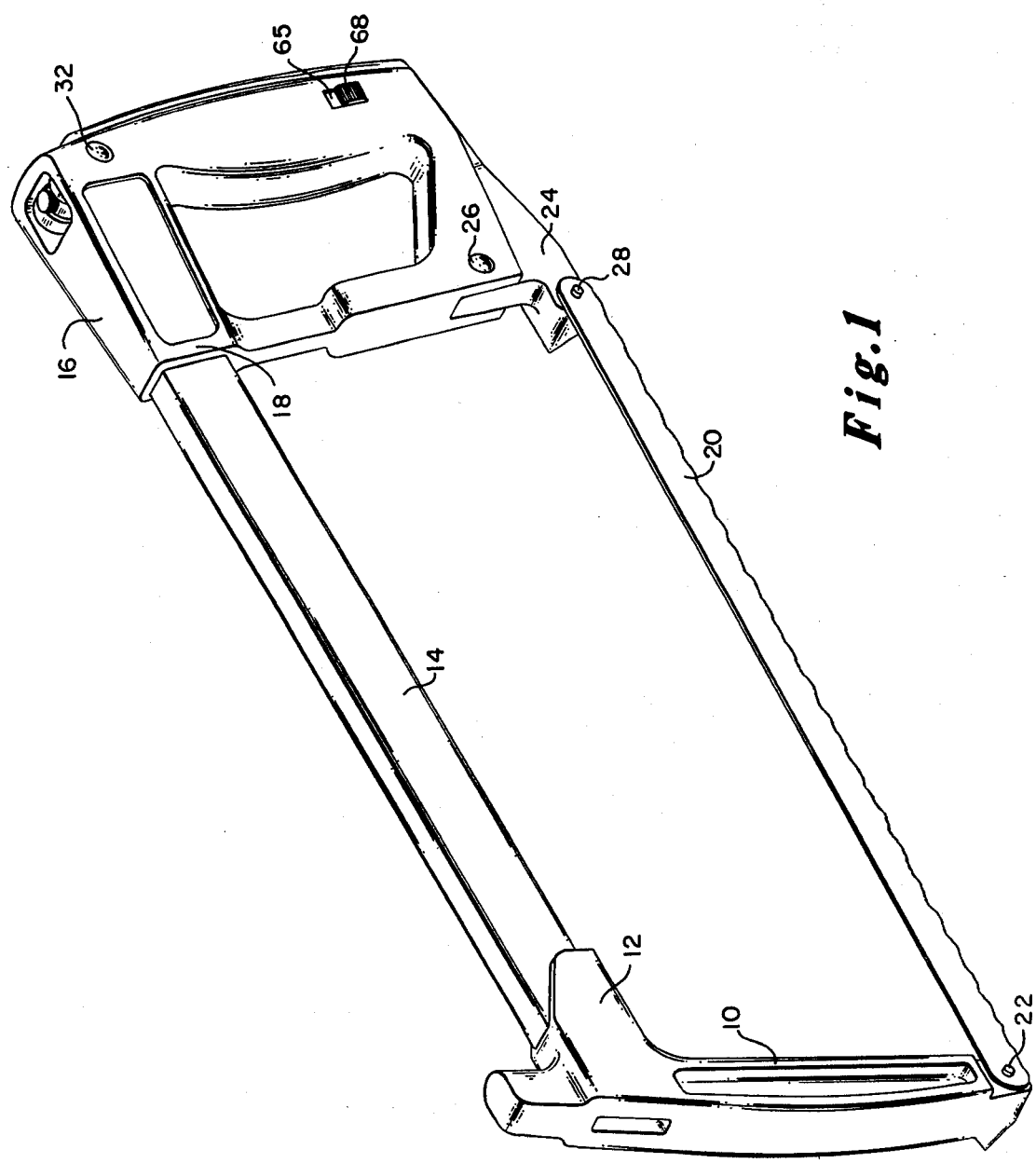
FIG. 1 is a perspective view of the hacksaw of this invention in which the lever is shown closed and locked to the handle.
Figure 2:
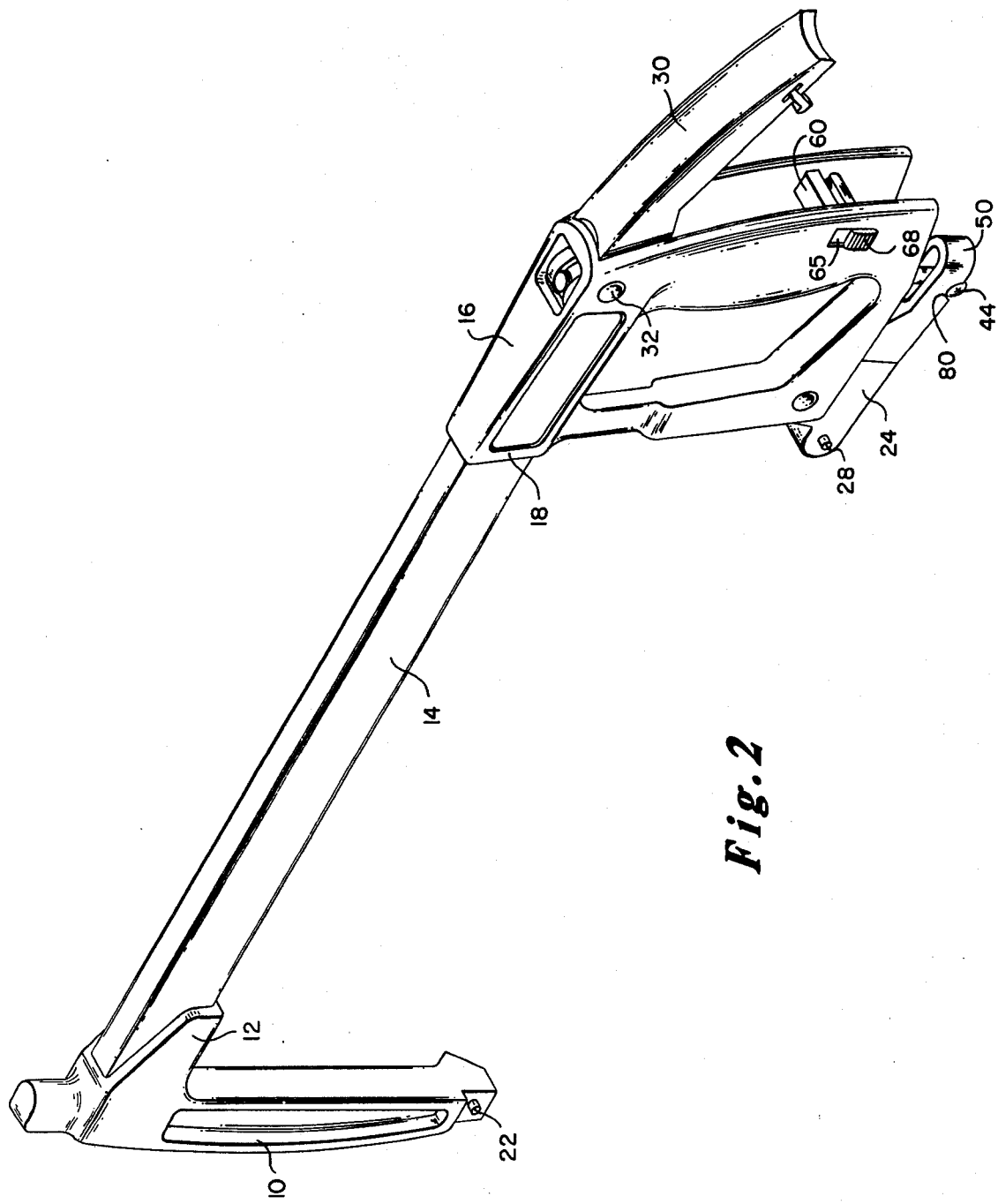
FIG. 2 is another perspective view of the hacksaw in which the lever is shown unlocked and open.

The hacksaw of this invention is shown in perspective in FIGS. 1 and 2. The hacksaw includes a front frame member 10 which is generally vertical. Front frame member 10 has a rearwardly opening socket 12 which is sized and shaped to receive the forward end of a horizontal top frame bar 14 which has a rectangular cross-section and which is positioned at an approximate right angle to front frame member 10. Horizontal top frame bar 14 is preferably hollow to accommodate spare blades and is fixed to front frame member 10 by means of a retaining screw (unshown) which extends through a socket wall and a top frame bar wall at a right angle to both.

The hacksaw has a frame handle 16 which has a forwardly opening socket 18 which is sized and shaped to receive the rearward end of top frame bar 14. The handle 16 and the front frame member 10 are preferably made of aluminum, whereas the top frame bar 14 is preferably made of steel.

The hacksaw blade 20 has a mounting aperture at each of its two ends. The front aperture is slipped over the front pin 22 which is located on the lower portion of the front frame member 10.

A rocker arm 24 is pivotally mounted on the lower portion of frame handle 16 by means of lower pivot pin 26. A back pin 28 is located on the forward portion of the rocker arm 24, and the rear aperture of blade 20 is slipped over and is held by back pin 28.

Figure 4:
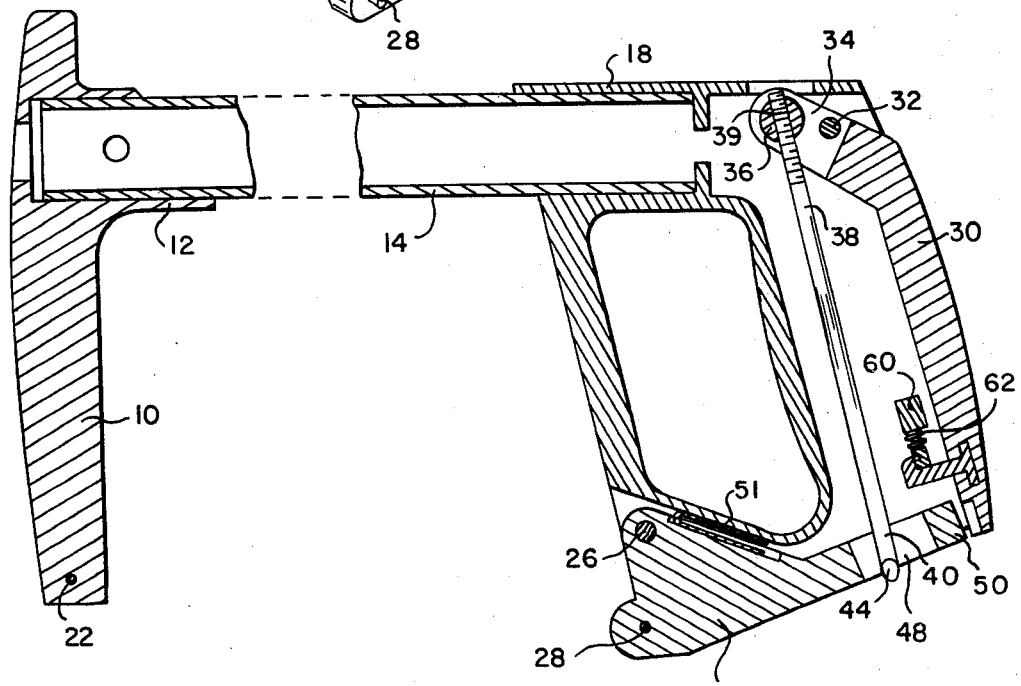
FIG. 4 is a side elevation, in section, in which the lever is shown closed and locked in its near-maximum clockwise position.

It will be seen from FIGS. 4–5 that when the rocker arm is pivoted in the clockwise direction about lower pivot pin 26, the back pin 28 rotates upwardly and forwardly, and thereby reduces the distance between the front pin 22 and the back pin 28. Conversely, when rocker arm 24 is pivoted in the counter-clockwise direction about pivot pin 26, the back pin 28 rotates downwardly and rearwardly, and thereby increases the distance between the front pin 22 and the back pin 28. Thus, it will be appreciated that blade tension can be adjusted by pivoting the rocker arm to selected angular positions. The structure that has thus far been described is common to both applicant's hacksaw and to the hacksaw shown in U.S. Pat. No. 4,367,779.

Referring now to FIGS. 3–7, applicant's improved blade-tensioning mechnism will be described in detail. Movable lever 30 is pivotally mounted at its upper end to the upper portion of frame handle 16. Lever 30 is pivoted to handle 16 by upper pivot pin 32 and is manually movable between a closed and locked position (FIG. 4) and an open and unlocked position (FIG. 5). The forwardly extending rod-mounting portion 34 has aligned transverse apertures in which a solid cylinder 36 is received and retained. Solid cylinder 36 acts as a pivot pin and is freely and rotatably movable.

A tension rod 38 is threaded at its upper end 39. Solid cylinder 36 contains a screw-threaded aperture 37 extending transversely therethrough. The screw-threaded upper end 39 of the tension rod is threadably engaged in the screw-threaded aperture 37. Thus, tension rod 38 is pivotally retained by solid cylinder 36 and hangs downwardly. It will be seen that when lever 30 is unlocked and opened (FIG. 5), tension rod 38 will descend, and when lever 30 is closed and locked (FIG. 4), tension rod 38 will rise. The hanging tension rod has a cross-member 44 provided at its lower end 40 for purposes to be subsequently described.

Cross-member 44 is fixed to the lower end 40 of tension rod 38. Cross-member 44 is positioned at a right angle to tension rod 38, thereby forming a T-bar. When cross-member 44 is rotated, the tension rod 38 is rotated. Rocker arm 24 has an opening 48 in its rear portion 50. The tension rod 38 extends through opening 48 so that cross-member 44 is positioned below rear portion 50. Spring 51 is positioned between frame handle 16 and rocker arm 24 and continuously urges the rocker arm to pivot in the clockwise direction. Thus, rear portion 50 of the rocker arm is continuously urged downwardly against cross-member 44.

It will be seen that turning cross-member 44 causes the rear portion 50 of rocker arm 24 to be adjustably moved up or down relative to the pivot axis of solid cylinder 36. Cross-member 44 is used to set the exact final distance between the front and back blade-mounting pins and thus determines the magnitude of the final tension which is placed on blade 20 when lever 30 is closed and locked.

In order to maintain lever 30 in its closed position (FIG. 4), a latch means is provided on the lever and the interior of the grip portion of handle 16. Lever 30 has, near its lower end, an upwardly bent locking finger 52. Like a human finger, locking finger 52 has a first horizontal portion 54, a second vertical portion 56, and a third horizontal or tip portion 58 (see FIGS. 3–4).

The latch means also includes a cross piece 60 which extends across and is mounted between the interior walls of the hollow grip portion of handle 16. Cross piece 60 has two cylindrical recesses formed in its lower face to receive and retain the upper ends of two coil springs 62. The springs 62 are parallel and extend downwardly.

The hand grip portion of handle 16 has two windows 64 forming opposing openings in the grip walls. Above the windows are recessed channels 65. A movable latch bar 66 (shown most clearly in FIG. 3) extends transversely and has two ribbed finger grips 68 formed at the ends of bar 66. Latch bar 66 extends through windows 64 and the finger grips 68 ride vertically in channels 65. It will be seen that normally the two coil springs 62 will urge latch bar 66 downwardly against the bottoms of the two windows 64. However, the hacksaw user can press upwardly on the two finger grips 68 to raise the latch bar.

The latch bar 66 is generally rectangular in cross-section, but is rounded at a rearward portion to form a latch bar cam surface 70. This surface is located so as to be cammed upwardly by a corresponding rounded forward surface on the second vertical portion 56 referred to as locking finger cam surface 72. Latch bar 66 has a short transverse channel 74 formed in its forward face in position to receive the rearwardly extending locking finger tip 58.

Figure 3:
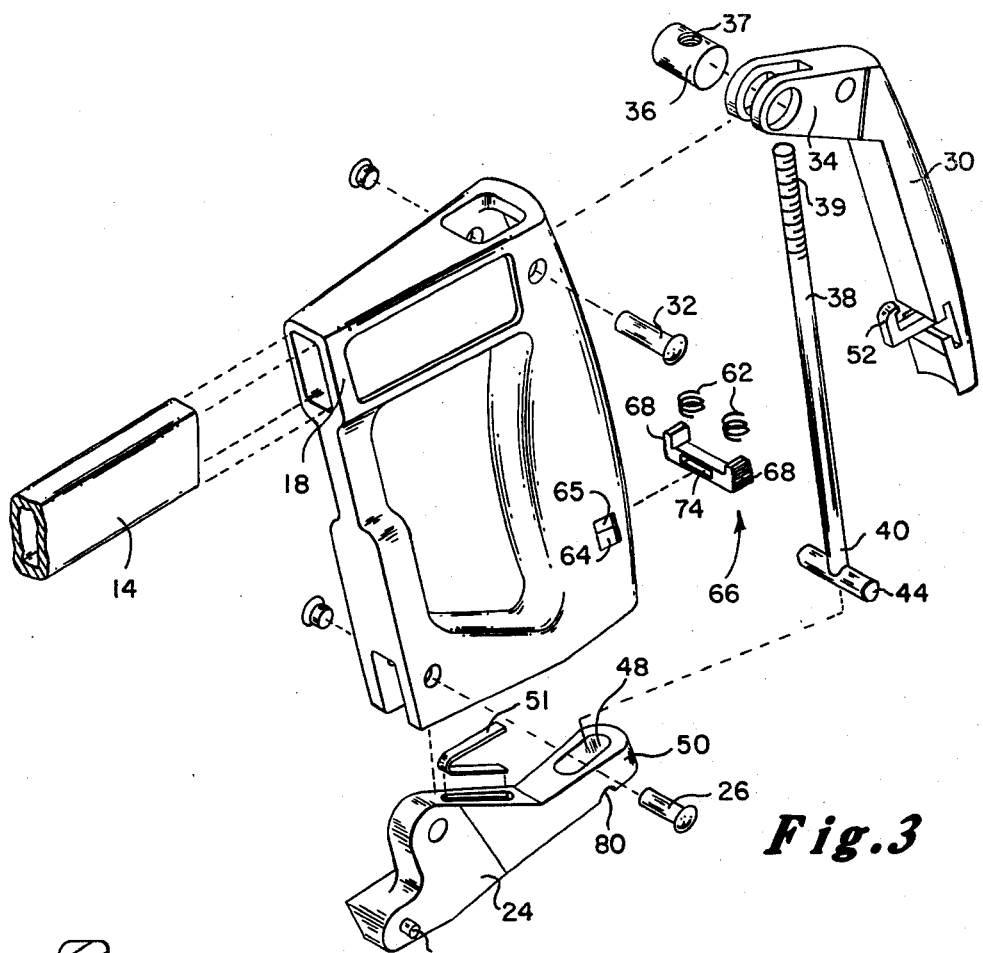
FIG. 3 is an exploded perspective view of the handle and related parts.

In order to overcome the problems caused by the prior art's infinitely adjustable knob on the lower end of the tension rod, applicant's cross-member 44 is designed not to be infinitely adjustable. This is accomplished by providing a transversely extending seating groove 80 on the lower side of rear portion 50 of rocker arm 24. This groove is best seen in FIGS. 2–3. The primary purpose of groove 80 is to accommodate the seating therein of cross-member 44 and to prevent any rotational movement of cross-member 44 (and tension rod 38) when lever 30 is locked closed. Another purpose of groove 80 is to provide a fixed position for cross-member 44 which can be selected time after time by the user. By such means, the blade tension can be easily reset at the identical amount even though lever 30 has been unlocked and opened between settings.

The operation of the tension-adjusting mechansim will now be described in detail. Lever 30 is first unlocked and opened (see FIG. 5). The blade apertures are then slipped over front pin 22 and back pin 28. The lever 30 is then moved clockwise to snug the blade on the pins. The user visually notes the alignment of line 82 (which is on lever 30 - see FIGS. 6–7) with the rear edge of frame handle 16. If there is no alignment, the user releases lever 30, removes the blade, lifts the rear portion 50 of the rocker arm against the spring tension, and rotates the cross-member 44 in 180° increments. After each half turn of cross-member 44, the rocker arm is released and the cross-member 44 seats itself in groove 80. Then, the blade is remounted, the lever is moved clockwise to snug the blade, and the alignment of line 82 with the rear edge of frame handle 16 is rechecked. These steps are repeated until alignment of line 82 is achieved. Then, the lever is closed and latched into locked position. By this means, a typical bimetallic blade will be consistently placed under approximately 32,000 psi tension.

Lever 30 is locked in the closed position shown in FIG. 4 by manually pivoting the lever to its maximum clockwise position. During this lever motion, locking finger cam surface 72 engages and cams latch bar cam surface 70 to lift downwardly biased movable latch bar 66. Locking finger 52 passes beneath latch bar 66 until fingertip 58 is clear. Then, latch bar 66 drops because of the action of coil springs 62. The continuous downward force on tension rod 38, produced by blade tension, causes the locking finger to snap back rearwardly when manual squeezing pressure on lever 30 is reduced. As the locking finger moves rearwardly, finger tip 58 enters latch bar transverse channel 74 where it is retained, even against any effort to push upwardly on the two finger grips 68. This is a safety feature preventing accidental unlocking of lever 30.

Intentional unlocking of lever 30 requires the use of two hands with opposite motions. That is, the hacksaw user must initially squeeze lever 30 so that the lever pivots in a clockwise direction from the locked position shown in FIG. 4 to the maximum clockwise position in which the locking finger tip 58 is moved forwardly entirely out of latch bar transverse channel 74. Then, the user pushes upwardly with his thumb and one finger on finger grips 68 to lift latch bar 66 into approximate abutment with the underside of cross piece 60. Finally, while upward pressure on finger grips 68 is maintained, the user relaxes his grip on lever 30, permitting the lever to swing open to the position shown in FIG. 5. This permits the blade to be removed from the frame or, alternatively, permits cross-member 44 to be rotated to increase or decrease the final blade tension setting.

This completes the detailed description of the structure and operation of the preferred embodiment of this invention. It will be appreciated that applicant's improved tension-adjustment mechanism permits a positive and replicable blade-tensioning setting which is free from infinite adjustment-caused creep. Applicant's mechanism is simple, quick, and requires low manual effort to operate, while applicant's latch means provides an effective safety measure preventing accidental sudden release of blade tension.

The above description obviously suggests many possible variations and modifications of this invention which would not depart from its spirit and scope. It should be unerstood, therefore, that the invention is not limited in its application to the details of structure specifically described or illustrated and that, within the scope of the appended claims, it may be practiced otherwise than as specifically described or illustrated.

I claim:

1. In a hacksaw of the type having a generally vertical front frame member, a blade-mounting front pin provided at the lower end of the front frame member, a horizontal top frame bar attached at its forward end to the upper end of the front frame member, a frame handle attached at its upper end to the rear end of the horizontal top frame bar, a rocker arm pivotally mounted on the lower portion of the frame handle, a blade-mounting back pin provided on a first portion of the rocker arm, a hacksaw blade fitted on and mounted between the front pin and the back pin, a manually movable lever pivotally attached adjacent its upper end to the frame handle, the lever having a rod-mounting portion located forwardly of the lever pivot point, a tension rod pivotally attached at its upper end to the rod-mounting portion and hanging downwardly therefrom, the tension rod cooperating at its lower end with a second portion of the rocker arm, the movable lever and the tension rod pivot points being located with relation to each other such that pivoting the lever clockwise towards the frame handle causes the tension rod to be lifted, and pivoting the lever counter-clockwise away from the frame handle causes the tension rod to be lowered, latch means for locking the lever to the frame handle, the lever pivoting clockwise to increase blade tension, and pivoting counter-clockwise to decrease blade tension, and adjustable blade tensioning means cooperating with the tension rod for altering the distance between the second portion of the rocker arm and the tension rod pivot point, an improvement to said adjustable blade tensioning means comprising:

(a) the rod-mounting portion being fixed against rotation about the axis of the tension rod;
   (b) the tension rod being rotatable about its own axis and being screw threaded at its upper end onto the rod mounting portion for up and down adjustment;
   (c) a manually rotatable cross-member fixed to the lower end of the tension rod to rotate the tension rod; and
   (d) means on the second portion of the rocker arm for engaging and positively preventing rotation of said cross-member when said cross-member is in contact with the rocker arm.

2. The hacksaw of claim 1 wherein the first portion of the rocker arm is the forward portion, and the second portion of the rocker arm is the rear portion.

3. The hacksaw of claim 1 wherein the tension rod has a screw threaded upper end, and the rod-mounting portion includes a screw threaded aperture into which the tension rod upper end is threadably engaged.

4. The hacksaw of claim 3 wherein said rod mounting portion includes a solid cylinder, said screw threaded aperture extending transversely through said cylinder.

5. The hacksaw of claim 2 further including spring means for biasing said rear portion of the rocker arm downwardly against said cross-member.

6. The hacksaw of claim 2 wherein the rocker arm has a transversely extending seating groove provided on its rear portion lower surface, said seating groove being sized and shaped to receive said cross-member and to retain said cross-member therein against rotational movement.

7. The hacksaw of claim 1 wherein the tension rod and said cross-member are formed as an integral T-bar.

8. The hacksaw of claim 1 wherein the lever has a visible blade tension indicating means provided thereon which provides guidance to the user during adjustment of the blade tensioning means.

9. The hacksaw of claim 8 wherein said visible blade tension indicating means is a straight line produced on the lever which, when the lever is latched, becomes aligned with the frame handle edge when recommended blade tension is achieved.

10. The hacksaw of claim 6 wherein said seating groove provides a positive and replicable blade tensioning means which is free from infinite adjustment-caused creep.

* * * * *